(12) United States Patent
Liao

(10) Patent No.: US 11,505,882 B2
(45) Date of Patent: Nov. 22, 2022

(54) SYSTEM FOR PERFORMING DYNAMIC PRODUCTION AND KNITTING MACHINE WORK MANAGEMENT

(71) Applicant: Wholeknit International Co., Ltd., Apia (WS)

(72) Inventor: Chih-Wen Liao, Taichung (TW)

(73) Assignee: WHOLEKNIT INTERNATIONAL CO., LTD., Apia (WS)

( * ) Notice: Subject to any disclaimer, the term of this patent is extended or adjusted under 35 U.S.C. 154(b) by 237 days.

(21) Appl. No.: 17/039,236

(22) Filed: Sep. 30, 2020

(65) Prior Publication Data

US 2021/0109510 A1 Apr. 15, 2021

(30) Foreign Application Priority Data

Oct. 15, 2019 (TW) .................................. 108136990

(51) Int. Cl.
*D04B 21/06* (2006.01)
*G06Q 10/08* (2012.01)
*D04B 15/66* (2006.01)

(52) U.S. Cl.
CPC ........... *D04B 21/06* (2013.01); *G06Q 10/087* (2013.01); *D04B 15/66* (2013.01)

(58) Field of Classification Search
CPC .................. D04B 21/06; D04B 15/66; G05B 2219/45191; G05B 2219/45192; G05B 2219/45193; G05B 2219/45194; G05B 2219/45195; G05B 2219/45196
See application file for complete search history.

(56) References Cited

U.S. PATENT DOCUMENTS

| 3,844,139 | A | * | 10/1974 | De Cerjat | D04B 15/66 66/215 |
| 4,031,718 | A | * | 6/1977 | Luth | D04B 15/66 700/14 |
| 4,964,031 | A | * | 10/1990 | Gotoh | D03J 1/006 139/1 R |
| 5,246,039 | A | * | 9/1993 | Fredriksson | D03D 47/3033 139/1 R |

(Continued)

*Primary Examiner* — Danny Worrell
(74) *Attorney, Agent, or Firm* — Muncy, Geissler, Olds & Lowe, P.C.

(57) ABSTRACT

The invention provides a system for performing dynamic production and knitting machine work management comprising a production demand management unit, an advanced scheduling management unit, a cloth pattern storage unit and a manufacturing execution unit. The production demand management unit receives at least one production demand data. The advanced scheduling management unit generates a production scheduling data according to working conditions of a plurality of knitting machines and the production demand data. The cloth pattern storage unit stores a plurality of knitting machine work setting data. The manufacturing execution unit controls each knitting machine to extract one of the plurality of knitting machine work setting data from the cloth pattern storage unit based on a production cloth pattern data. The knitting machine work setting data is forcibly deleted by the knitting machine when a knitting number meets a set value defined by the knitting number limiting data.

7 Claims, 8 Drawing Sheets

(56) References Cited

U.S. PATENT DOCUMENTS

| | | | | |
|---|---|---|---|---|
| 6,611,730 | B1* | 8/2003 | Stoll | D04B 7/26 |
| | | | | 700/131 |
| 6,845,285 | B2* | 1/2005 | Kakimoto | D04B 15/99 |
| | | | | 66/75.2 |
| 6,931,299 | B2* | 8/2005 | Wang | D04B 15/99 |
| | | | | 700/141 |
| 6,937,918 | B2* | 8/2005 | Bahlmann | D01H 13/26 |
| | | | | 700/130 |
| 6,944,520 | B2* | 9/2005 | Stuwe | D04B 15/99 |
| | | | | 700/141 |
| 11,236,445 | B2* | 2/2022 | Maleck | D01H 4/42 |
| 2015/0376822 | A1* | 12/2015 | Onishi | D04B 15/88 |
| | | | | 66/153 |
| 2018/0130112 | A1* | 5/2018 | Gerson | G06Q 30/0643 |
| 2019/0368085 | A1* | 12/2019 | Morgan | G05B 19/4097 |
| 2021/0109510 | A1* | 4/2021 | Liao | G06Q 10/087 |
| 2021/0348307 | A1* | 11/2021 | Blaser | H04L 67/12 |

* cited by examiner

SYSTEM FOR PERFORMING DYNAMIC PRODUCTION AND KNITTING MACHINE WORK MANAGEMENT

FIELD OF THE INVENTION

The invention relates to a system, in particular to a system for performing dynamic production and knitting machine work management.

BACKGROUND OF THE INVENTION

The existing knitting machine is unable to automatically delete the cloth pattern data used at present immediately after knitting operation is completed, namely, the cloth pattern data stored in each knitting machine needs to be removed from the machine table through extra operation by workers. As a result, bad employees in the factory will have a credible opportunity. Once the employee steals the design in the machine table to produce himself or herself and sells himself or herself before finished products of the factory is publicly sold, the factory will be suspected of violating the client's privacy agreement and the reputation of the factory will be harmed. Even more, if an employee steals a file and jumps to a competing company, it is a great hurt to the factory.

SUMMARY OF THE INVENTION

The main purpose of the invention is to solve the problem that the cloth pattern data cannot be deleted immediately and automatically after the knitting operation is completed in a conventional knitting machine, so that the cloth pattern data may leakage from the factory.

To achieve this object, the present invention provides a system for performing dynamic production and knitting machine work management, the system comprising a production demand management unit, an advanced scheduling management unit, a cloth pattern storage unit and a manufacturing execution unit. The production demand management unit receives at least production demand data. The advanced scheduling management unit is connected with the production demand management unit and generates a production scheduling data based on working conditions of a plurality of knitting machines in a factory area and the production demand data, wherein the production scheduling data comprises a plurality of sub-scheduling data corresponding to the plurality of knitting machines, and each sub-scheduling data corresponds to one of the plurality of knitting machines and comprises a production cloth pattern data and a knitting number limiting data corresponding to the production cloth pattern data. The cloth pattern storage unit stores a plurality of knitting machine work setting data which respectively corresponds to different cloth patterns, wherein a cloth pattern knitted by each of the plurality of knitting machine work setting data corresponds to the production cloth pattern data of one of the sub-scheduling data. The manufacturing execution unit is connected with the advanced scheduling management unit and the cloth pattern storage unit, and controls each of the plurality of knitting machines to work according to one of the plurality of sub-scheduling data, wherein each of the plurality of knitting machines extracts one of the plurality of knitting machine work setting data from the cloth pattern storage unit for knitting according to the production cloth pattern data included in one of the plurality of sub-scheduling data, and the production cloth pattern data is deleted forcibly if a knitting number of each of the plurality of knitting machines meets a set value defined by the knitting number limiting data.

In one embodiment, the system comprises a warehousing management unit and a transport dispatching unit, and the manufacturing execution unit comprises a plurality of material data generated based on each of the plurality of sub-scheduling data, each of the plurality of material data is generated based on a production material of the production cloth pattern data and a knitting number defined by the knitting number limiting data, and the warehousing management unit is connected with the production demand management unit and records a plurality of material storage data which respectively comprises a name information, a location information and a quantity information, and the transport dispatching unit is connected with the manufacturing execution unit and the warehousing management unit, and the transport dispatching unit controls at least one of a plurality of porter robots based on one of based on one of the plurality of sub-scheduling data to be implemented by one of the plurality of knitting machines, and the at least one of a plurality of porter robots is controlled to transport the production material corresponding to one of the plurality of material data to one of the plurality of knitting machines.

In one embodiment, the transport dispatching unit records a plurality of location points and controls the plurality of porter robots based on the plurality location points.

In one embodiment, the transport dispatching unit is connected with at least one portable electronic device held by a worker, and the transport dispatching unit controls at least one of the plurality of porter robots to transport based on a designated transport request sent by the portable electronic device.

In one embodiment, the transport dispatching unit is connected with at least one auxiliary delivery device in the factory area, and the transport dispatching unit controls the auxiliary delivery device according to a delivery route of one of the plurality of porter robots.

In one embodiment, the auxiliary delivery device is selected from the group consisting of a lifting device, a conveyor belt, or a mechanic arm.

In one embodiment, the manufacturing execution unit receives a good quantity data and a bad quantity data after each of the plurality of sub-scheduling data is executed, and the advanced scheduling management unit adds a supplementary production sub-scheduling data to the production scheduling data based on working conditions of the plurality of knitting machines, the production demand data, and the bad quantity data.

Comparing with the conventional technology, the present invention has the following characteristics. The production cloth pattern data is deleted forcibly when a knitting number of each of the plurality of knitting machines meets a set value defined by the knitting number limiting data, so that the production cloth pattern data in the weaving machine can be deleted without extra operation by employees, and the production cloth pattern data are free of doubt of leakage.

DETAILED DESCRIPTION OF THE PREFERRED EMBODIMENTS

The detailed description and technical contents of the present invention will now be described with reference to the drawings as follows.

Figure 1:
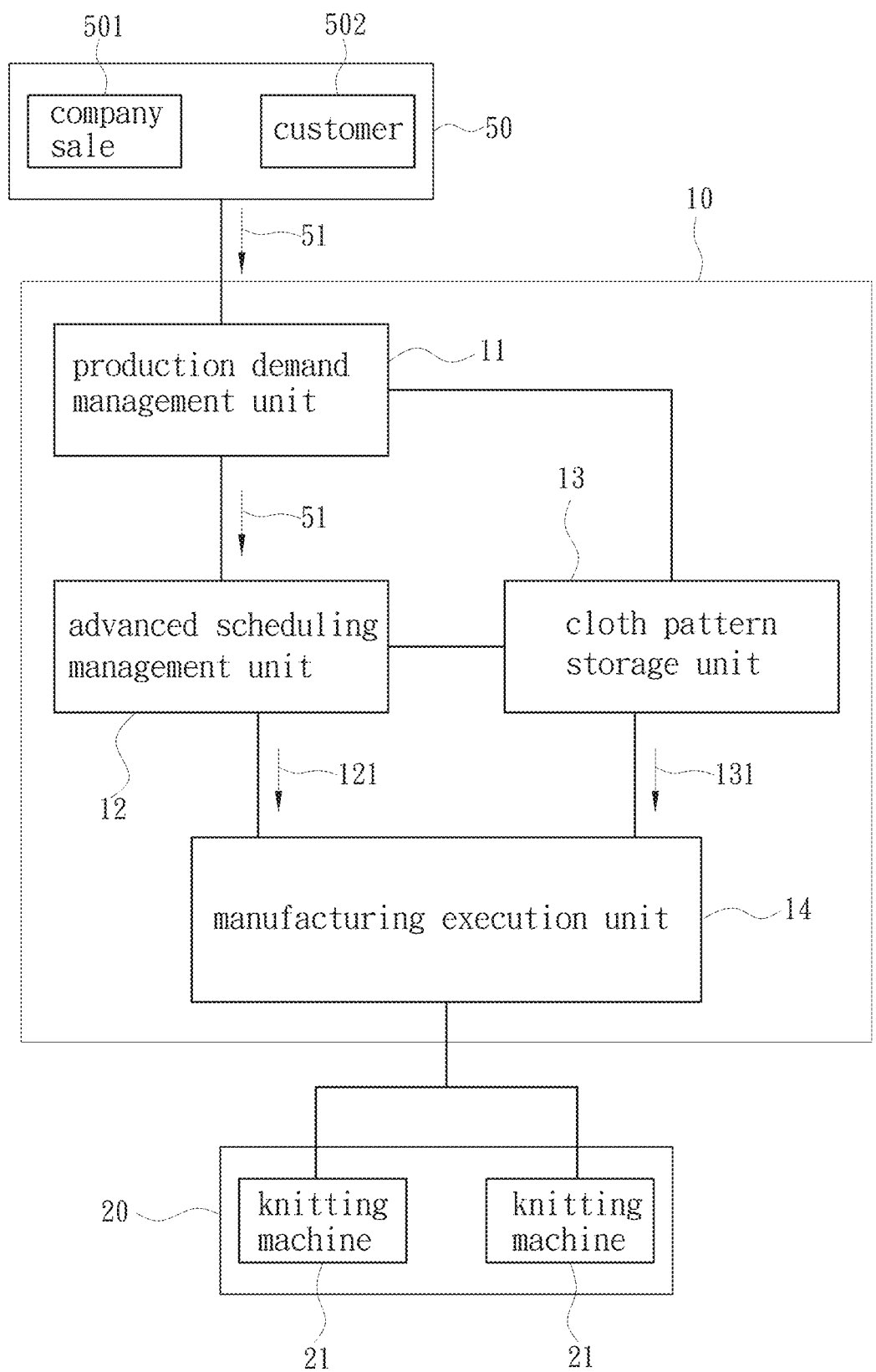
FIG. 1 is a schematic diagram of a system unit according to a first embodiment of the present invention.
Figure 2:
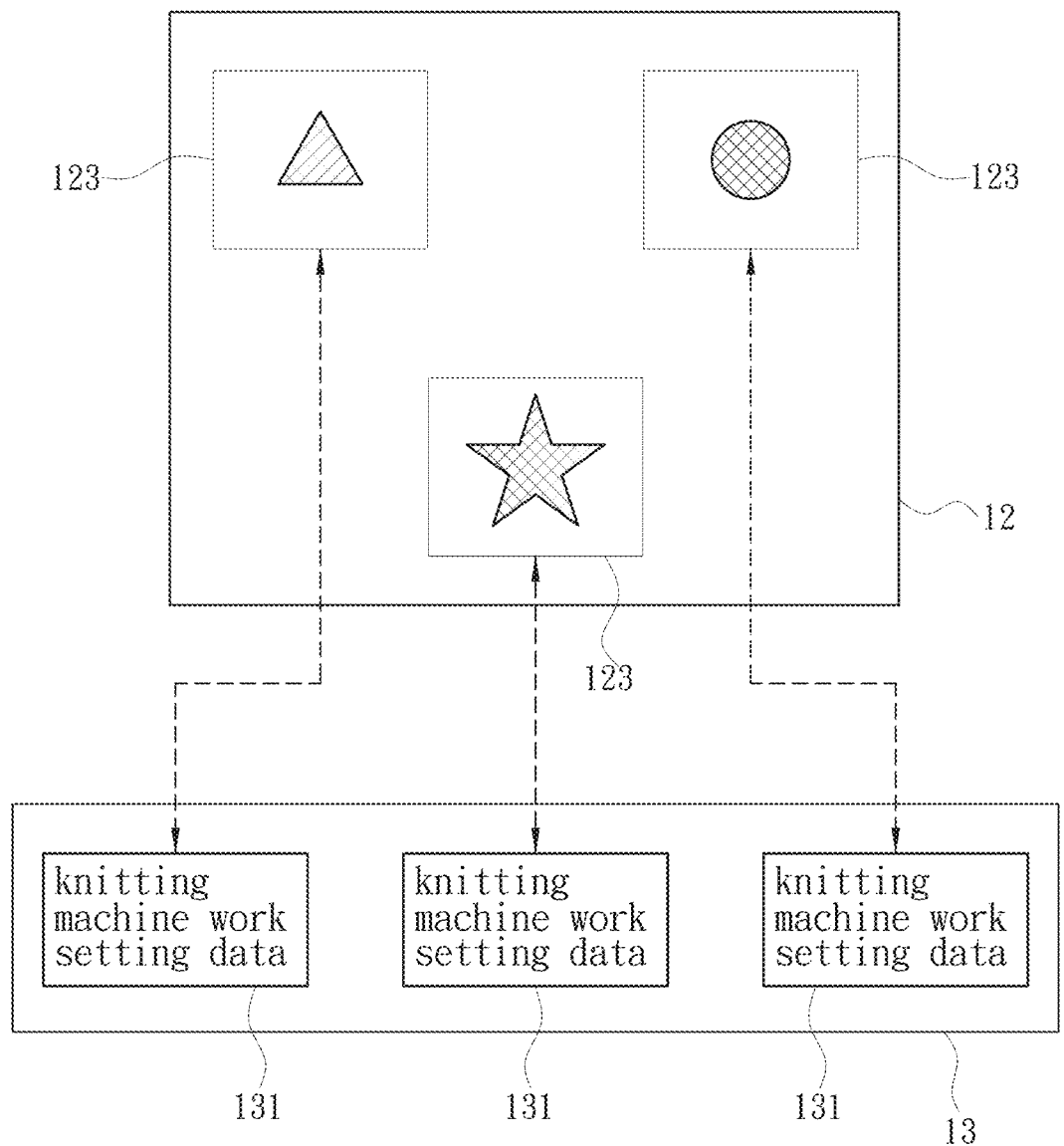
FIG. 2 is a unit schematic diagram of knitting machine work setting data corresponding to the production cloth pattern data according to an embodiment of the invention.
Figure 3:
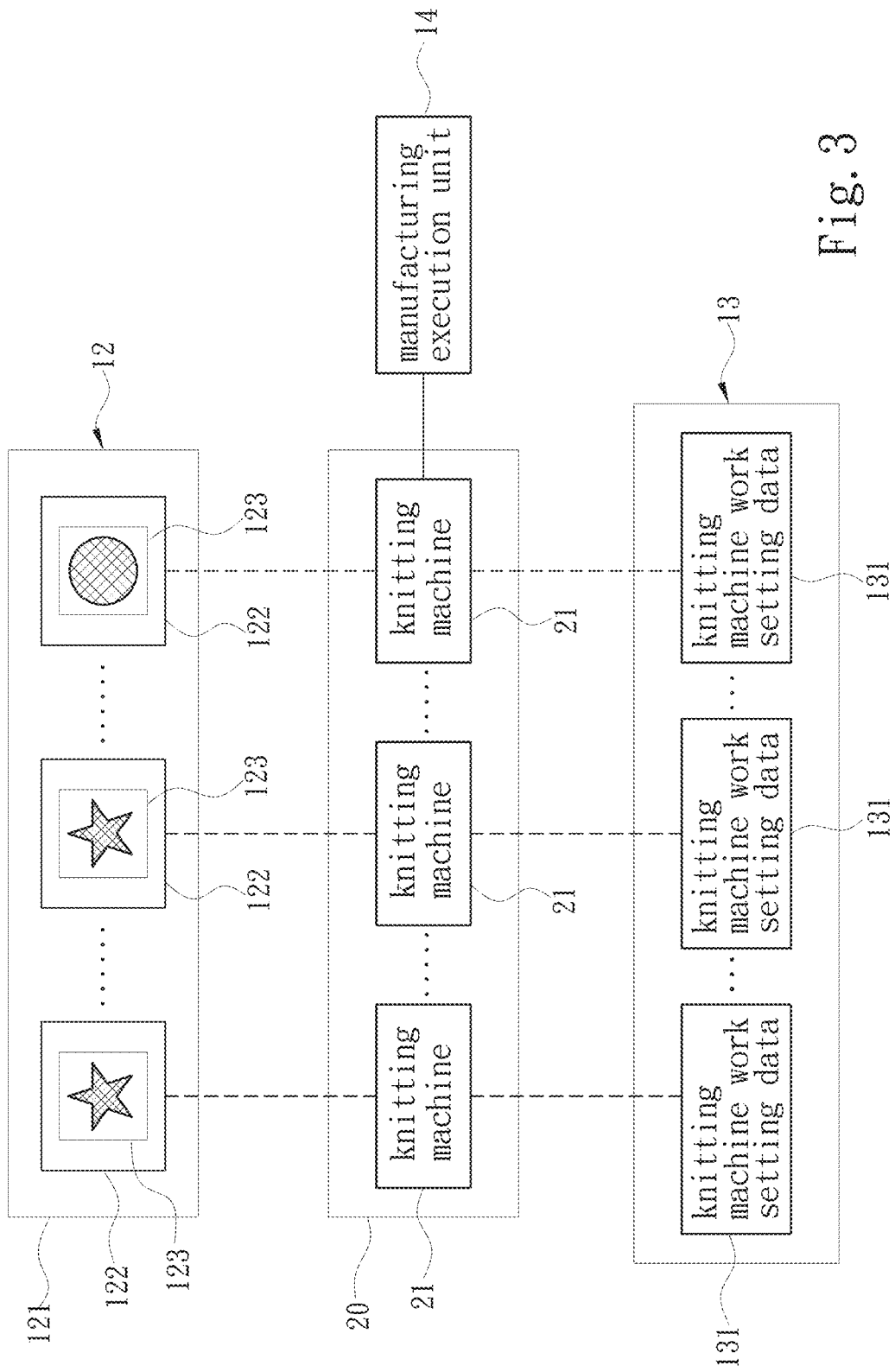
FIG. 3 is a unit schematic diagram of a knitting machine corresponding to production cloth pattern data according to an embodiment of the present invention.

Referring to FIG. 1, FIG. 2 and FIG. 3, the present invention provides a system 10 for performing dynamic production and knitting machine work management. The system 10 is used to facilitate knitting machine work management in a factory area 20. The system 10 includes a production demand management unit 11, an advanced scheduling management unit 12, a cloth pattern storage unit 13, and a manufacturing execution unit 14. Further, the production demand management unit 11, the advanced scheduling management unit 12, the cloth pattern storage unit 13, and the manufacturing execution unit 14 are elements of a computer device (not shown), respectively, and the system 10 of the present invention is capable of being added with different functional elements according to demands of the factory area 20 upon implementation.

Further, the production demand management unit 11 receives at least one production demand data 51 which is presented by a third party 50, other than the system 10, to the production demand management unit 11. For example, the third party 50 is at least one company sales 501 or at least one customer 502. The system 10 of the present invention is operated by the at least one company sale 501 or the at least one customer 502, and the production demand data 51 is generated and transmitted to the production demand management unit 11. Further, the advanced scheduling management unit 12 is connected with the production demand management unit 11. The advanced scheduling management unit 12 receives the production demand data 51 transmitted by the production demand management unit 11, and generates a production scheduling data 121 based on the production demand data 51 and working conditions of a plurality of knitting machines 21 in the factory area 20. The plurality of knitting machines 21 is a circular knitting machine or a flat knitting machine, and the production scheduling data 121 provides scheduling works of each of the plurality of knitting machines 21 in the factory area 20. For example, the production scheduling data 121 provides a starting time, a processing required time of a manufacturing process and an ending time of each of the plurality of knitting machine 21 in the knitting operation. That is, the production scheduling data 121 includes a plurality of sub-scheduling data 122 corresponding to the plurality of knitting machines 21, and each of the plurality of sub-scheduling data 122 corresponds to one of the plurality of knitting machines 21 only. Further, each of the plurality of sub-scheduling data 122 includes a production cloth pattern data 123 and a knitting number limiting data corresponding to the production cloth pattern data 123, wherein the production cloth pattern data 123 is referred herein as a cloth pattern of a batch of fabric to be knitted, and the knitting number limiting data is referred as a number of times set for the plurality of knitting machines 21 to knit the cloth pattern based on each of the plurality of sub-scheduling data 122. For example, assuming that two knitting machines 21 are included in the factory area 20, and one hundred pairs of jogging shoes which respectively include a star pattern on an upper surface are set to the production scheduling data 121 of the advanced scheduling management unit 12 for being knitted by two knitting machines 21. At this time, the advanced scheduling management unit 12 generates two sub-scheduling data 122 included in the production scheduling data 121, and each sub-scheduling data 122 corresponds to one of the two plurality of knitting machines 21. The production cloth pattern data 123 of each sub-scheduling data 122 is the stat pattern on the upper surface of jogging shoes, and the knitting number limiting data is set as "50". In other words, the two knitting machines 21 respectively knit fifty pairs of jogging shoes which respectively include the star pattern on the upper surface according to the production scheduling data 121.

Further, the cloth pattern storage unit 13 is connected with the advanced scheduling management unit 12. The cloth pattern storage unit 13 stores a plurality of knitting machine work setting data 131, and the plurality of knitting machine work setting data 131 comprises work settings of the plurality of knitting machines 21 during knitting. For example, the work settings are a needle outlet state or a yarn feeding mode and the like. Further, the plurality of knitting machine work setting data 131 respectively corresponds to different cloth patterns, and the cloth pattern produced by each of the plurality of knitting machine work setting data 131 corresponds to the cloth pattern of one of the plurality of production cloth pattern data 123. In one embodiment, the cloth pattern storage unit 13 is built by a pattern designer, a knitting machine manufacturer or a textile manufacturer, and the cloth pattern storage unit 13 is an element of the computer device or a cloud database, and the knitting machine work setting data 131 is able to be downloaded via the cloud database upon implementation. In addition, the manufacturing execution unit 14 is connected with the advanced scheduling management unit 12 and the cloth pattern storage unit 13, and the manufacturing execution unit 14 controls each of the plurality of knitting machines 21 to work according to one of the plurality of sub-scheduling data 122. Specifically, each of the plurality of knitting machines 21 extracts one of plurality of the knitting machine work setting data 131 from the cloth pattern storage unit 13 based on the production cloth pattern data 123 included in one of the plurality of sub-scheduling data 122, and knitting operation is performed based on the knitting machine work setting data 131. Further, the knitting machine work setting data 131 is deleted forcibly if the knitting number of one of the plurality of knitting machines 21 meets a set value defined by the knitting number limiting data. For example, assuming that the knitting number limiting data provided by the sub-scheduling data 122 is set as "20", after each of the plurality of knitting machines 21 receives the knitting number limiting data and performs twenty times of knitting, each of the plurality of the knitting machines 21 forcibly deletes the knitting machine work setting data 131.

Referring to FIG. 1, FIG. 2 to FIG. 3, an embodiment of the system 10 for performing dynamic production and knitting machine work management of the present invention is described. Assuming that the production demand management unit 11 receives the production demand data 51 initially, the advanced scheduling management unit 12 generates the production scheduling data 121 based on the production demand data 51 and working conditions of the plurality of knitting machines 21 to be processed, after the advanced scheduling management unit 12 receiving the production demand data 51. Further, each of the plurality of knitting machine work setting data 131 are stored in the cloth pattern storage unit 13 based on the corresponding production demand data 51 in advance. Thereafter, the manufacturing execution unit 14 controls each of the plurality of knitting machines 21 to perform knitting based on the knitting machine work setting data 131 and the production scheduling data 121. When the knitting number performed by each of the plurality of knitting machines 21 meets a set value defined by the knitting number limiting data, each of the plurality of knitting machines 21 stops the knitting operation and forcibly deletes the knitting machine work setting data 131 at the moment. Accordingly, the present invention allows the knitting number of each of the plurality of knitting machines 21 to be limited by the knitting number limiting data which is included in each of the plurality of sub-scheduling data 122 of the advanced scheduling management unit 12. Accordingly, the present invention is free from doubt of leakage by forcibly delete the plurality of knitting machine work setting data 131 if the knitting number of the plurality of knitting machines 21 meet the set value defined by the knitting number limiting data.

Figure 4:
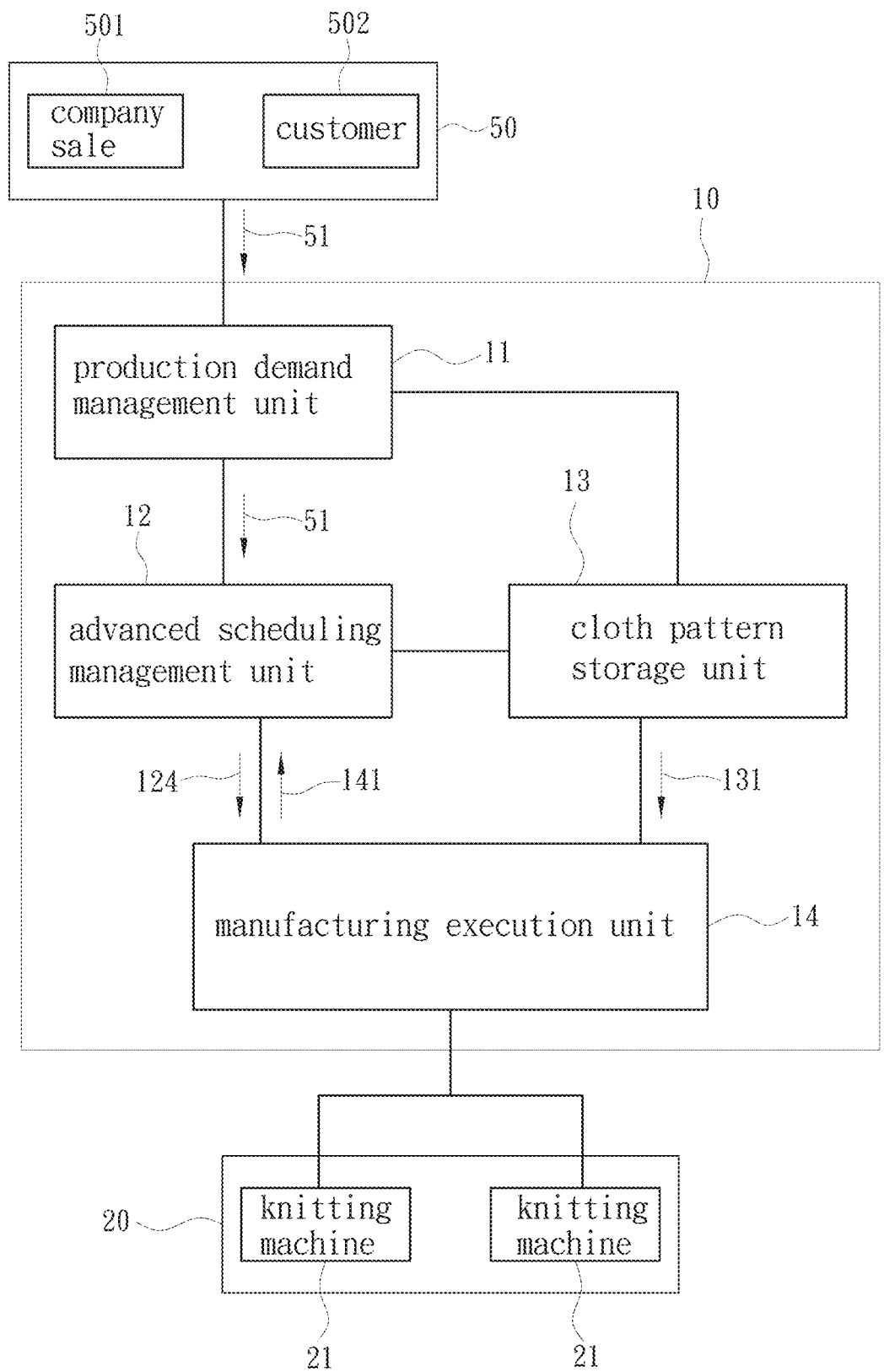
FIG. 4 is a schematic diagram of a system unit according to a second embodiment of the present invention.

In one embodiment, referring to FIG. 4, because the knitting number limiting data refers to a total number of times that the plurality of knitting machines 21 perform knitting on the basis of each sub-scheduling data 122, that is, the plurality of knitting machines 21 have a chance to produce a part of defective products on the basis of the knitting number limiting data during knitting. The system 10 is provided to avoid a problem that the plurality of knitting machines 21 are unable to supplement a number of products to substitute a number of defective products due to a limitation of the knitting number limiting data. The manufacturing execution unit 14 receives a quantity data of good product and a quantity data of defective product 141 after each of the plurality of sub-scheduling data 122 is performed, and the advanced scheduling management unit 12 adds a supplementary production sub-scheduling data 124 to the production scheduling data 121 based on the working conditions of the plurality of knitting machines 21, the production demand data 51 and the quantity data of defective product 141. The advanced scheduling management unit 12 generates the supplementary production sub-scheduling data 124 based on the working conditions of the plurality of knitting machines 21 which are about to complete a sub-scheduling operation upon implementation, and the manufacturing execution unit 14 controls the plurality of knitting machines 21 to continuously supplement and produce the number of products corresponding to the number of defective products based on the supplementary production sub-scheduling data 124. In another embodiment, the manufacturing execution unit 14 also controls one of the plurality of knitting machines 21 to perform supplementary production based on the supplementary production sub-scheduling data 124 after knitting operations are completed by the plurality of knitting machines 21.

Figure 5:
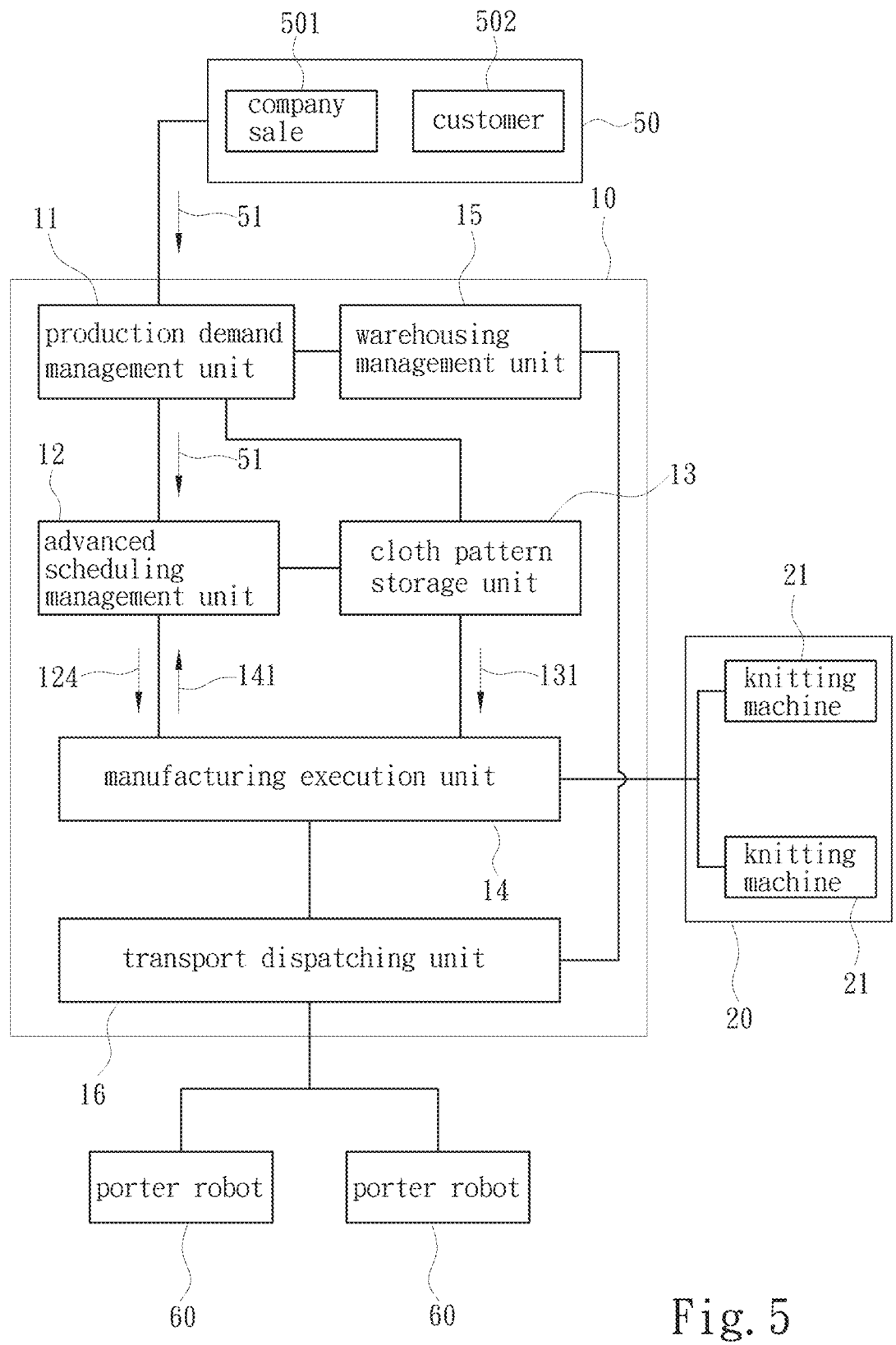
FIG. 5 is a schematic diagram of a system unit according to a third embodiment of the present invention.

On the other hand, referring to FIG. 5, the system 10 further comprises a warehousing management unit 15 and a transport dispatching unit 16, wherein the warehousing management unit 15 is connected with the production demand management unit 11, and the warehousing management unit 15 records a plurality of material storage data which respectively corresponds to one of a plurality of production materials, and the plurality of material storage data respectively comprises a name information, a quantity information and a location information. The name information refers to each product name of the plurality of production materials, the quantity information is about a product quantity of each of the plurality of production materials, and the location information refers to a location where each of the plurality of production materials is placed. Further, with reference to FIG. 6, the location where each of the plurality of production materials placed is a plurality of operation areas 22 in the factory area 20. The plurality of operation areas 22 are provided with the plurality of knitting machines 21 according to requirements, and the plurality of operation areas 22 include a reception area 221 for placing raw materials upon entry into the factory, a raw material storage area 222 for storing the raw materials, a production and processing area 223 for processing the raw materials to form semi-finished products, a product inspection buffer area 224 for temporarily storing semi-finished products to be inspected, a finished product storage area 225 for storing finished products and a to-be-shipped area 226 for placing finished products to be delivered. For example, assuming that there are three thousand finished jogging shoe covers are placed in the finished product storage area 225 of the factory area 20, the warehousing management unit 15 will record the name information for one of the plurality of production materials as "finished jogging shoe cover", the quantity information is an amount of "3000", and the location information is "the finished product storage area 225".

Figure 6:
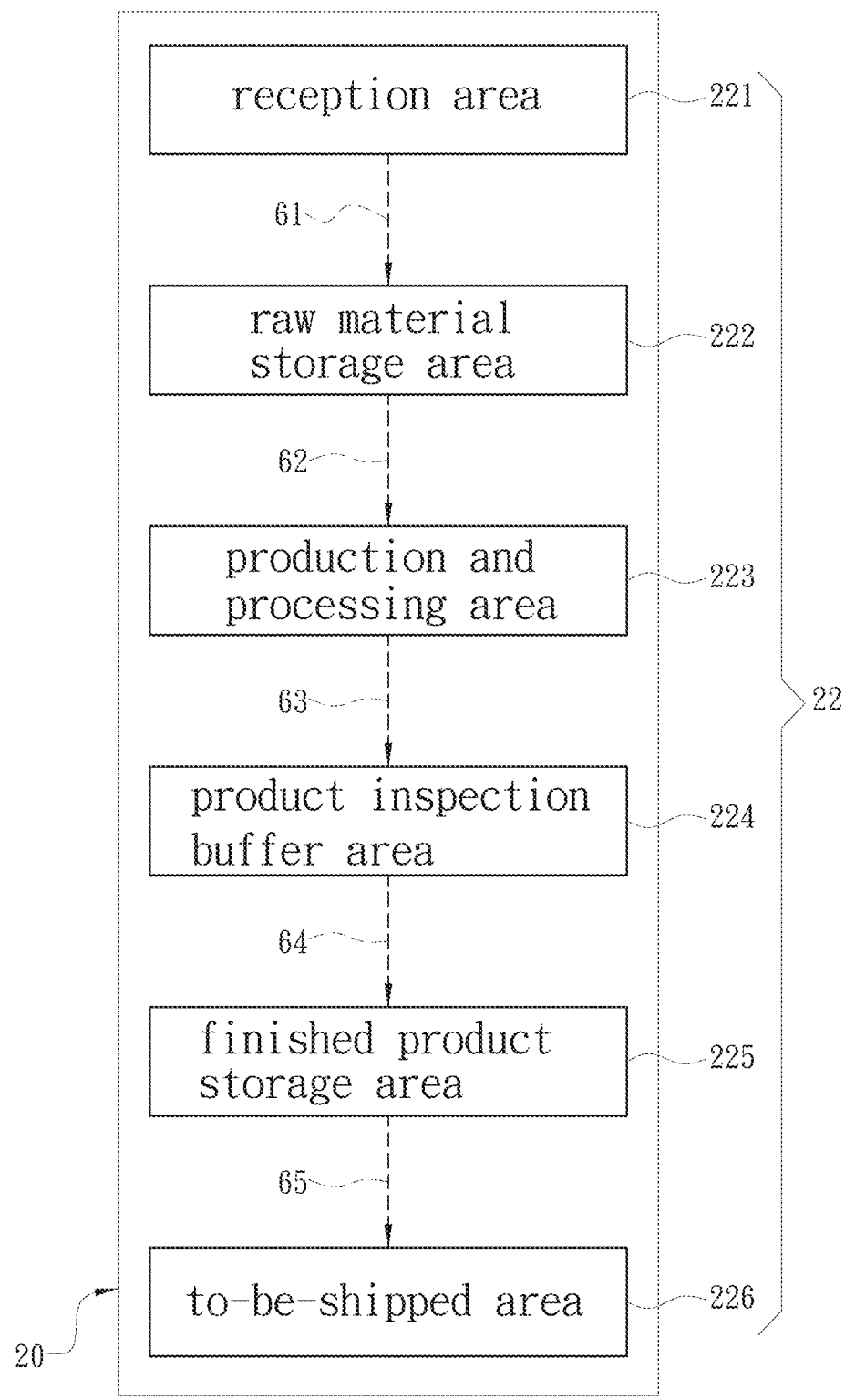
FIG. 6 is a schematic diagram of a factory area configuration according to a first embodiment of the present invention.

Accordingly, referring to FIG. 1 and FIG. 6, the manufacturing execution unit 14 includes a plurality of material data generated based on each of the plurality of sub-scheduling data 122, respectively, wherein each of the plurality of material data is generated based on the production cloth pattern data 123 and the knitting number limiting data. The production cloth pattern data 123 includes the cloth pattern to be knitted and the plurality of production materials required to knit the cloth pattern. The plurality of material data are generated from the production cloth pattern data 123 which records materials and the knitting number limiting data which defines the knitting number. The transport dispatching unit 16 is connected with the manufacturing execution unit 14 and the warehousing management unit 15, and the transport dispatching unit 16 controls at least one of a plurality of porter robots 60 based on one of the plurality of sub-scheduling data 122 to be implemented by one of the plurality of knitting machines 21, and the at least one of a plurality of porter robots 60 is controlled to transport the plurality of production materials to one of the plurality of knitting machines 21 which is designated according to the plurality of material data. For example, when one of the plurality of sub-scheduling data 122 provides the plurality of production materials to perform production, the raw materials to be required are first taken from the raw material storage area 222 for knitting, processing and then inspection, and the transport dispatching unit 16 controls at least one of the plurality of porter robots 60 based on the sub-scheduling data 122 to transport the raw materials to be knitted from the raw material storage area 222 to the production and processing area 223. After knitting is completed, the transport dispatching unit 16 controls at least one of the plurality of porter robots 60 to transport knitted materials to be inspected from the production and processing area 223 to the product inspection buffer area 224. In one embodiment, the factory area 20 provides a plurality of location points which is recorded by the transport dispatching unit 16, so that the transport dispatching unit 16 fully controls a transport route of each of the plurality of porter robots 60 in the plurality of operation areas 22. In implementation, the transport dispatching unit 16 controls each of the plurality of porter robots 60 based on the plurality of location points, so that each of the plurality of porter robots 60 follows a transport route without interference problems such as collision. Further, the transport dispatching unit 16 also monitors a moving status of each of the plurality of porter robots 60 based on each of the plurality of location points. For example, the raw material storage area 222 and the production and processing area 223 are respectively provided with one of the plurality of location points. When the transport dispatching unit 16 intends to control one of the plurality of porter robots 60 to transport raw materials from the raw material storage area 222 to the production and processing area 223, one of the plurality of porter robots 60 controlled by the transport dispatching unit 16 first passes through one of the plurality of location points in the raw material storage area 222 and then passes through the other one of the plurality of location points in the production and processing area 223. Once the controlled transport robot 60 has passed one of the plurality of location points in the raw material storage area 222 and has not reached the other one of the plurality of location points in the production and processing area 223 within a predetermined time, the transport dispatching unit 16 notifies an employee in the factory area 20 to sooner detect an abnormality of the controlled porter robot 60 since the transport route of the controlled porter robot 60 is not recorded, thereby reducing the time required for exception removal. In addition, the transport dispatching unit 16 also controls portable areas of the plurality of porter robots 60 based on the plurality of location points. For example, the plurality of location points are respectively provided in the reception area 221, the raw material storage area 222, the production and processing area 223, the product inspection buffer area 224, the finished product storage area 225 and the to-be-shipped area 226 of the factory area 20. The plurality of porter robots 60 are divided into a first porter robot 61 moving back and forth between the reception area 221 and the raw material storage area 222, a second porter robot 62 moving back and forth between the raw material storage area 222 and the production and processing area 223, a third porter robot 63 moving back and forth between the production and processing area 223 and the product inspection buffer area 224, a fourth porter robot 64 moving back and forth between the product inspection buffer area 224 and the finished product storage area 225, and a fifth porter robot 65 moving back and forth between the finished product storage area 225 and the to-be-shipped area 226. Accordingly, the transport dispatching unit 16 adjusts the portable areas of the plurality of porter robots 60 to reduce a required waiting time of the system 10 for transporting.

Figure 7:
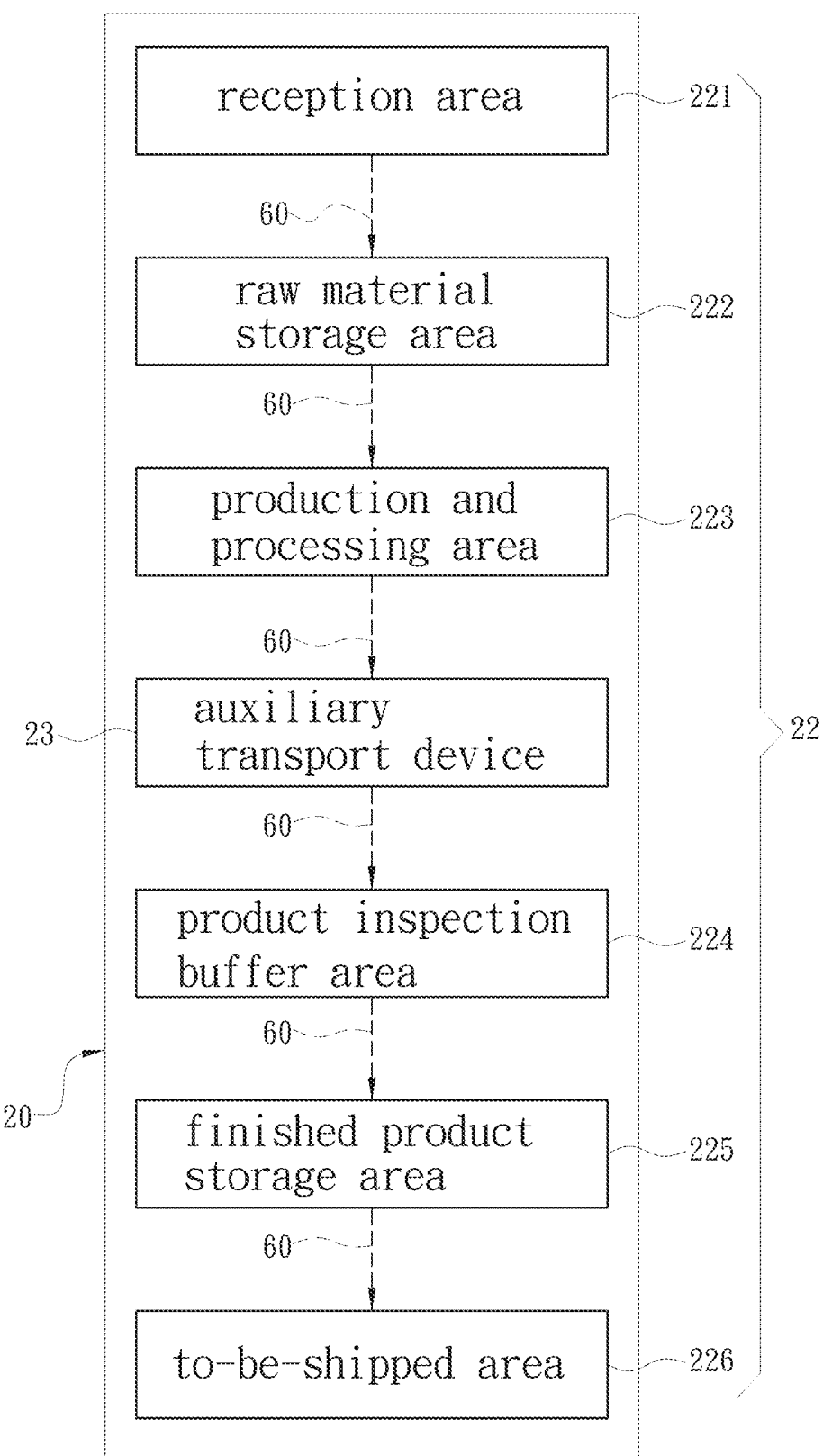
FIG. 7 is a schematic diagram of a factory area configuration according to a third embodiment of the present invention.

Thus, in one embodiment, referring to FIG. 7, since the plurality of porter robots 60 are hindered from moving due to a slope or an obstacle that may be provided in the factory area 20, and the factory area 20 includes at least one auxiliary transport device 23 connected with the transport dispatching unit 16. In one embodiment, the auxiliary transport device 23 is a lifting device, a conveyor belt or a mechanical arm. In practice, the transport dispatching unit 16 controls the auxiliary transport device 23 according to the transport route of one of the plurality of porter robots 60. In other words, one of the plurality of porter robots 60 gradually approaches the obstacle in the factory area 20 while transporting the production materials, the transport dispatching unit 16 controls the auxiliary transport devices 23 to take over the production materials from one of the plurality of porter robots 60 so as to continuously move the production materials. For example, a slope is located in the production and processing area 223 and the product inspection buffer area 224 of the factory area 20 and the lifting device is provided at a position corresponding to the slope, when the plurality of porter robots 60 leaves the production and processing area 223, the transport dispatching unit 16 controls the lifting device to take over the production materials from the plurality of porter robots 60, thus assisting the plurality of porter robots 60 in transporting the production materials to be inspected to the product inspection buffer area 224.

Figure 8:
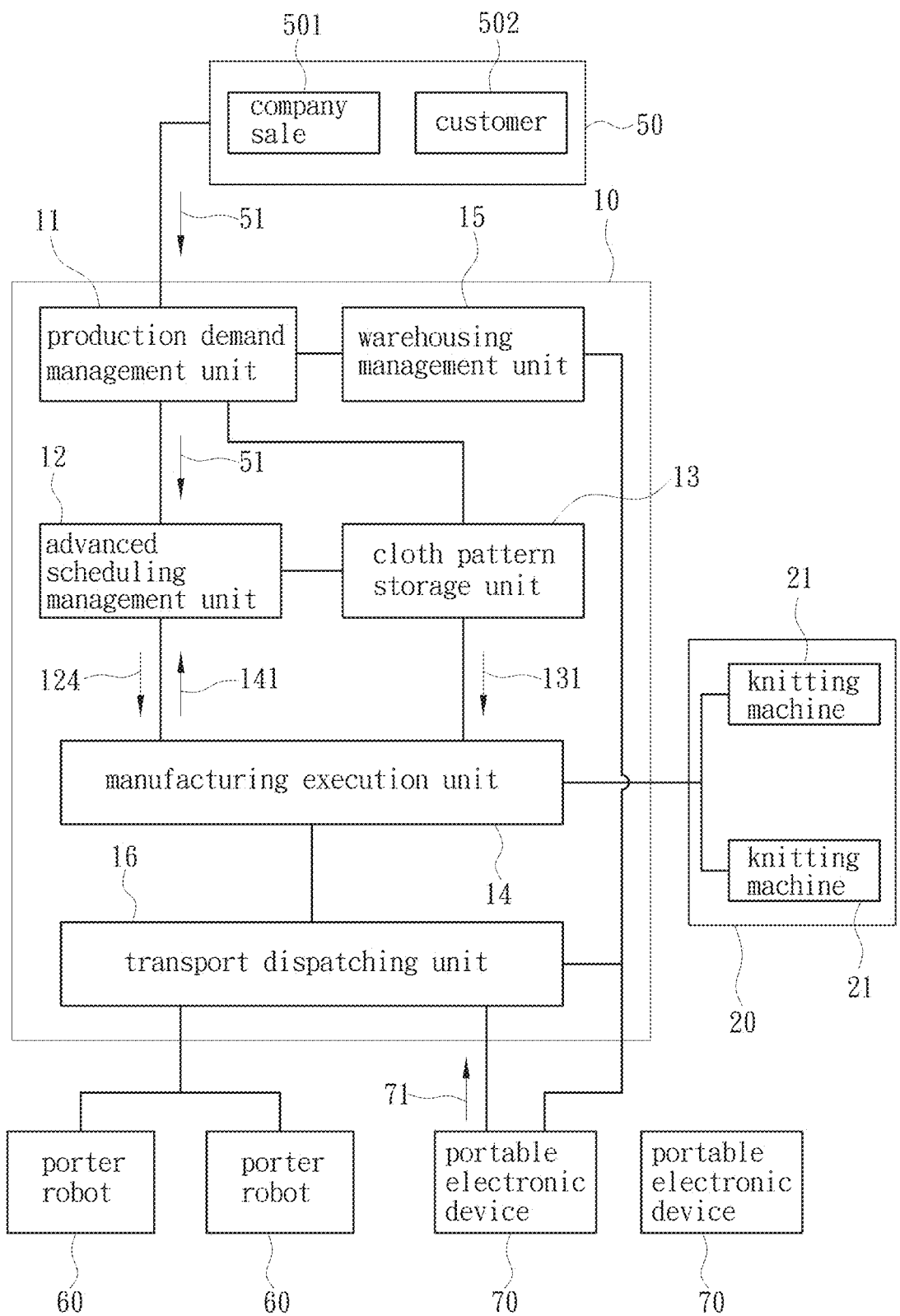
FIG. 8 is a schematic diagram of a system unit according to a fourth embodiment of the present invention.

In one embodiment, referring to FIG. 8, the transport dispatching unit 16 controls not only the plurality of porter robots 60 based on each sub-scheduling data 122, but also controls at least one of the plurality of porter robots 60 to transport based on a designated transport request 71 sent by a portable electronic device 70. In other words, when a worker of the factory has a demand for transporting the production materials, the worker can operate the portable electronic device 70 to send and transmit the designated transport request 71 to the transport dispatching unit 16. At this time, the transport dispatching unit 16 controls at least one of the plurality of porter robots 60 to move to one of the plurality of operation area 22 which is designated for delivery.

What is claimed is:

1. A system for performing dynamic production and knitting machine work management, comprising:
   a production demand management unit, receiving at least one production demand data;
   an advanced scheduling management unit, connected with the production demand management unit, and the advanced scheduling management unit generating a production scheduling data based on working conditions of a plurality of knitting machines in a factory area and the production demand data, wherein the production scheduling data comprises a plurality of sub-scheduling data corresponding to the plurality of knitting machines, and each sub-scheduling data corresponds to one of the plurality of knitting machines and comprises a production cloth pattern data and a knitting number limiting data corresponding to the production cloth pattern data;
   a cloth pattern storage unit, storing a plurality of knitting machine work setting data which respectively corresponds to different cloth patterns, wherein a cloth pattern knitted by each of the plurality of knitting machine work setting data corresponds to the production cloth pattern data of one of the sub-scheduling data; and
   a manufacturing execution unit, connected with the advanced scheduling management unit and the cloth pattern storage unit, and the manufacturing execution unit controlling each of the plurality of knitting machines to work according to one of the plurality of sub-scheduling data, wherein each of the plurality of knitting machines extracts one of the plurality of knitting machine work setting data from the cloth pattern storage unit for knitting according to the production cloth pattern data included in one of the plurality of sub-scheduling data, and the production cloth pattern data is deleted forcibly if a knitting number of each of the plurality of knitting machines meets a set value defined by the knitting number limiting data.

2. The system according to claim 1, wherein the system further comprises a warehousing management unit and a transport dispatching unit, and the manufacturing execution unit comprises a plurality of material data generated based on each of the plurality of sub-scheduling data, each of the plurality of material data is generated based on a production material of the production cloth pattern data and a knitting number defined by the knitting number limiting data, and the warehousing management unit is connected with the production demand management unit and records a plurality of material storage data which respectively comprises a name information, a location information and a quantity information, and the transport dispatching unit is connected with the manufacturing execution unit and the warehousing management unit, and the transport dispatching unit controls at least one of a plurality of porter robots based on one of based on one of the plurality of sub-scheduling data to be implemented by one of the plurality of knitting machines, and the at least one of a plurality of porter robots is controlled to transport the production material corresponding to one of the plurality of material data to one of the plurality of knitting machines.

3. The system according to claim 2, wherein the transport dispatching unit records a plurality of location points and controls the plurality of porter robots based on the plurality location points.

4. The system according to claim 2, wherein the transport dispatching unit is connected with at least one portable electronic device held by a worker, and the transport dispatching unit controls at least one of the plurality of porter robots to transport based on a designated transport request sent by the portable electronic device.

5. The system according to claim 2, wherein the transport dispatching unit is connected with at least one auxiliary delivery device in the factory area, and the transport dispatching unit controls the auxiliary delivery device according to a delivery route of one of the plurality of porter robots.

6. The system according to claim 5, wherein the auxiliary delivery device is selected from the group consisting of a lifting device, a conveyor belt, or a mechanic arm.

7. The system according to claim 1, wherein the manufacturing execution unit receives a good quantity data and a bad quantity data after each of the plurality of sub-scheduling data is executed, and the advanced scheduling management unit adds a supplementary production sub-scheduling data to the production scheduling data based on working conditions of the plurality of knitting machines, the production demand data, and the bad quantity data.

* * * * *